United States Patent [19]

Rosendall

[11] Patent Number: 4,701,195
[45] Date of Patent: Oct. 20, 1987

[54] ROOM AIR TREATMENT SYSTEM

[75] Inventor: Henry J. Rosendall, Grand Rapids, Mich.

[73] Assignee: Amway Corporation, Ada, Mich.

[21] Appl. No.: 881,940

[22] Filed: Jul. 3, 1986

[51] Int. Cl.$^4$ .............................................. B01D 46/10
[52] U.S. Cl. ........................................ 55/473; 55/316;
55/385 A; 55/502; 55/504; 55/508; 55/500
[58] Field of Search ..................... D23/139, 141, 150;
55/271, 316, 472, 473, 483, 492, 502, 504, 508,
509, 356, 385 A, 500

[56] References Cited

U.S. PATENT DOCUMENTS

| | | | |
|---|---|---|---|
| 2,920,717 | 1/1960 | Tuttle et al. | 55/504 X |
| 3,174,775 | 3/1965 | Clayton | 55/504 X |
| 3,654,747 | 4/1972 | Remick | 55/316 X |
| 3,745,750 | 7/1973 | Arff | 55/102 |
| 3,802,168 | 4/1974 | Deckas | 55/423 |
| 3,812,370 | 5/1974 | LaViolette | 55/316 X |
| 3,861,894 | 1/1975 | Marsh | 55/316 |
| 3,928,008 | 12/1975 | Petersen | 55/472 |
| 3,942,964 | 3/1976 | Shuler | 55/509 X |
| 4,252,547 | 2/1981 | Johnson | 55/234 |
| 4,268,285 | 5/1981 | Mason | 55/271 |
| 4,559,067 | 12/1985 | Dunston | 55/356 X |

OTHER PUBLICATIONS

Brochure entitled "Instapure Air Filtration System" by Teledyne Water Pik, 1985, Models AF1-W, AF2-W and AF3-W.

Primary Examiner—Charles Hart
Attorney, Agent, or Firm—Price, Heneveld, Cooper, DeWitt & Litton

[57] ABSTRACT

A room air treatment system includes a housing or cabinet defining a filter chamber and a blower chamber. A blower, disposed within the blower chamber, is connected to the filter chamber by a duct. Positioned within the filter chamber is a HEPA filter and activated carbon or charcoal filter assembly. The housing defines an air inlet covered by a prefilter and an air outlet within which a louver assembly is disposed. A pivotal bail or generally U-shaped rod engages a generally rectangular filter retaining frame to sealingly retain the filter stack within the filter chamber. A control system is included for controlling operation of the blower motor.

20 Claims, 5 Drawing Figures

4,701,195

ROOM AIR TREATMENT SYSTEM

BACKGROUND OF THE INVENTION

The present invention relates to an air treatment system and more particularly to an improved system for removing airborne particulate matter, smoke, odors and the like from the air of a closed area, such as a room.

Various systems have been proposed for treating or filtering the air of relatively closed environments. Such systems are generally used in the home, office or other areas where it is desired to remove smoke, particulate matter, dust, pollen, odors and the like. Present systems typically include a blower which directs room air through a filter assembly. The filter assembly may include a high efficiency particulate air filter referred to in the trade as a HEPA filter. Such high efficiency filters have, for example, an efficiency rating of 99.97% for 0.3 micron particles. In addition, activated charcoal or activated carbon filters may be included to remove odors from the air. A control system may be provided to control blower speed and/or to provide manual or automatic timed operation of the system. Examples of prior room air purifiers or treatment systems may be found in U.S. Pat. No. 3,802,168 entitled ROOM AIR CLEANER and issued on Apr. 9, 1974, to Deckas; U.S. Pat. No. 3,861,894 entitled PORTABLE CLEAN-AIR GENERATOR and issued on Jan. 21, 1975, to Marsh; U.S. Pat. No. 3,928,008 entitled FILTERING APPARATUS and issued on Dec. 23, 1975, to Petersen.

In air treatment systems, it is important to provide for ease of installation and replacement of the filter assembly. Problems have been experienced with achieving an effective seal within the cabinet structure to insure that air passes through the filter. The achieving of an effective seal may be compromised by the need to make the filter assembly easily replaceable by the end user.

SUMMARY OF THE INVENTION

In accordance with the present invention, the aforementioned problems are substantially eliminated. Essentially, an air treatment system is provided which includes a housing defining a filter chamber. A filter assembly is disposed within the filter housing. Provision is made for sealing the filter assembly within the housing to insure that the air to be treated passes through the filter without leakage. In narrower aspects of the invention, the system includes an elongated, generally U-shaped bail or rod structure pivoted within the housing. The bail engages a filter retaining frame to resiliently bias the filter in a spring-like fashion into engagement with a seal disposed within the housing.

BRIEF DESCRIPTION OF THE DRAWINGS

FIG. 3 is a rear, elevational view of the air treatment system;

DETAILED DESCRIPTION OF THE PREFERRED EMBODIMENT

Figure 1:
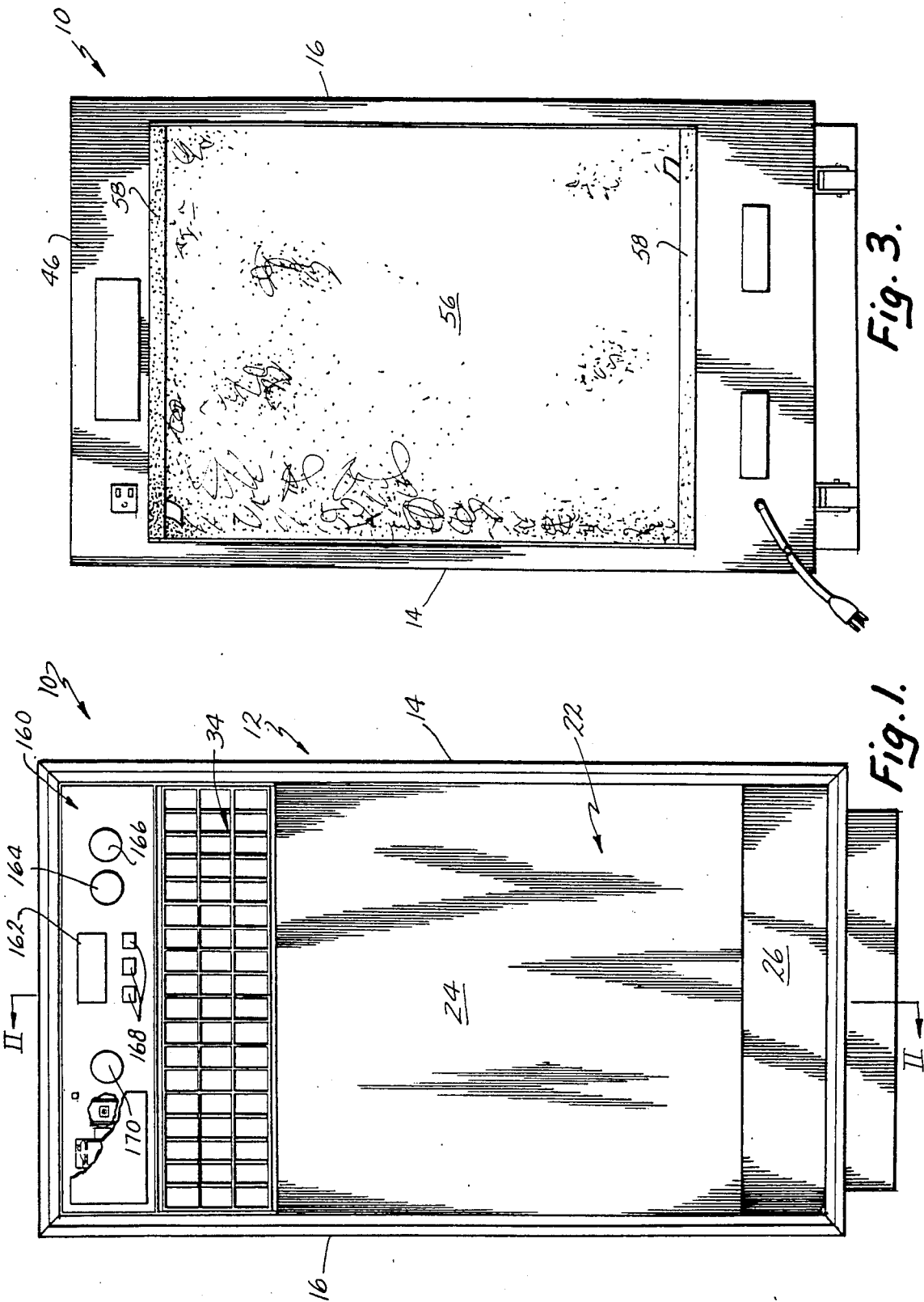
FIG. 1 is a front, elevational view of an air treatment system in accordance with the present invention.
Figure 2:
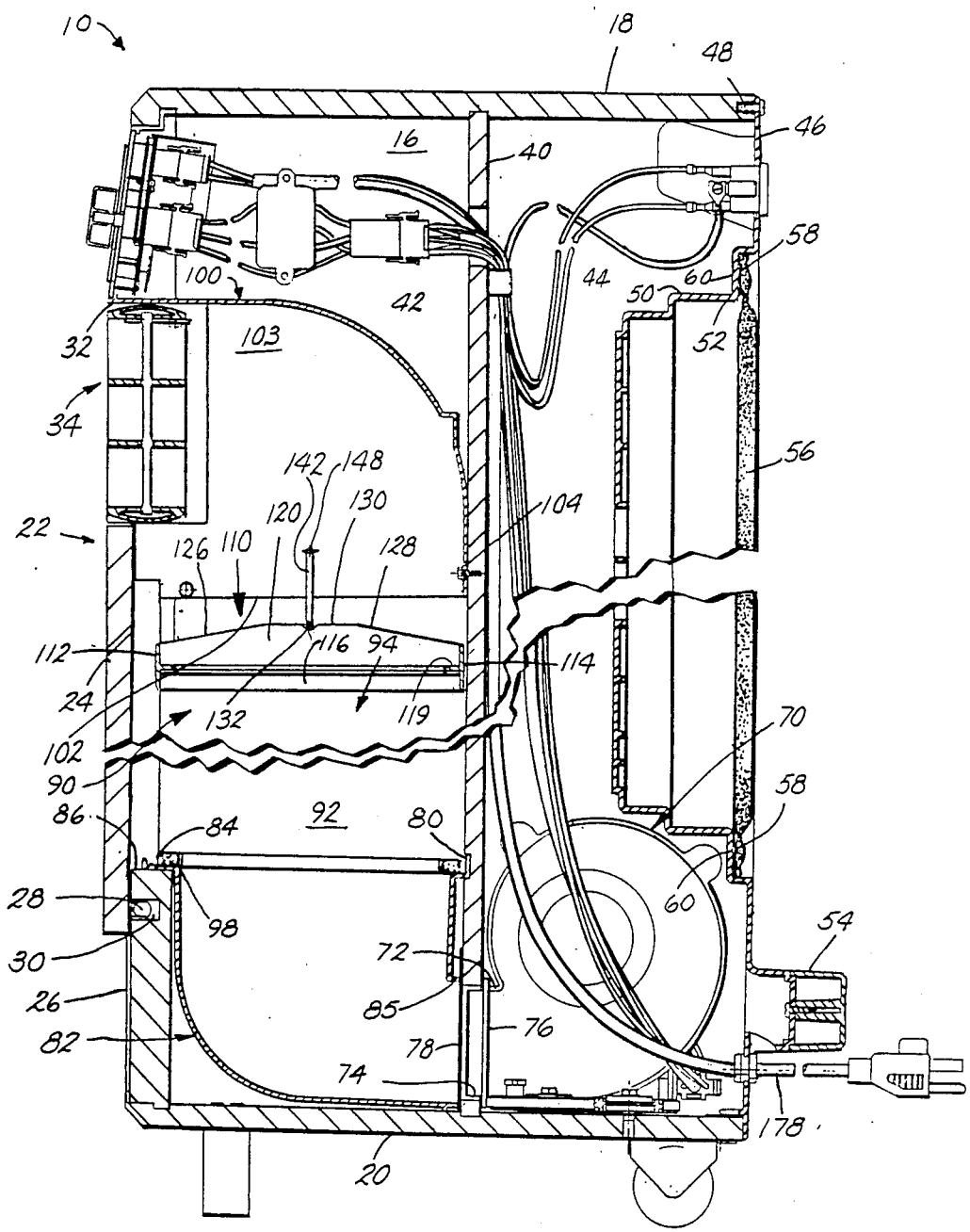
FIG. 2 is a cross-sectional view taken generally along line II—II of FIG. 1.
Figure 4:
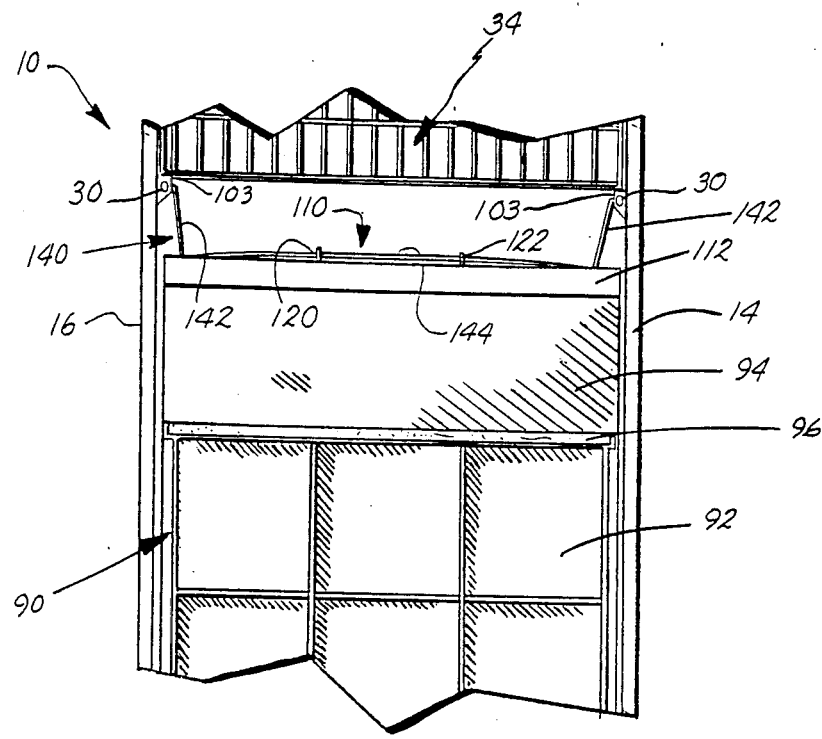
FIG. 4 is a fragmentary, front elevational view showing the system with the front panel removed.

A preferred embodiment of an air treatment system in accordance with the present invention is illustrated in FIGS. 1, 2 and 3 and generally designated by the numeral 10. System 10 includes a cabinet or housing 12. Housing 12 includes sidewalls or panels 14, 16, a top panel or wall 18 and a bottom panel or wall 20. A front panel 22 includes a removable panel portion 24 and a lower, fixed portion 26. Panel 24 is secured to panel portion 26 by snap fasteners 28 which are disposed within recesses 30 defined by panel portion 26 (FIGS. 2 and 4). Front panel 22 defines an outlet aperture 32 within which a louver assembly 34 is positioned.

An intermediate wall 40 extends between upper and bottom panels 18, 20 within cabinet 12. Intermediate wall 40 divides the cabinet into a filter chamber 42 and an inlet chamber or blower chamber 44. A rear panel 46 is secured to the cabinet panels by suitable fasteners 48. Rear panel 46 includes an integral inlet duct 50 which defines an inlet aperture or opening 52. In an existing embodiment, duct 50 supports prefilters (not shown). Secured to or formed integral with rear panel 46 is a cord bracket 54. A gross or prefilter 56 covers inlet aperture 52. Filter 56 may be a reticulated foam filter. Filter 56 is secured to the periphery of opening 52 by fabric locking strips or hook and loop fasteners 58, 60. Fabric strips 58 are folded over the upper edges and secured to filter 56. These fabric strips engage or lock to strips 60 which are suitably secured to the periphery of opening 52. Fabric tabs 59 (FIG. 3) are provided for removal of the prefilters. Gross filter 56 prevents hair, lint or other large particulates from entering blower chamber 44.

Mounted within chamber 44 is a blower motor unit 70 (FIG. 2). Unit 70 includes an outlet 72 positioned at an aperture 74 defined by intermediate wall 40. A seal 76 is positioned between blower 70 and wall 40. Also positioned at aperture 74 is a mesh screen or filter 78. As should be readily apparent, blower 70 will draw room air into cabinet 12 through filter 56.

Panel 40 defines a recess or ledge 80. A lower duct assembly 82 includes an upper peripheral flange 84. Flange 84 rests within recess 80 and on an upper surface 86 of front panel portion 26. Duct 82 includes an inlet aperture 85 which abuts mesh screen 78.

A filter assembly generally designated 90 is positioned within filter chamber 42. The filter assembly 90 includes a HEPA filter 92 and an activated carbon or charcoal filter 94. A foam gasket 96 (FIG. 4) is positioned between charcoal filter 94 and an upper surface of the HEPA filter 92. HEPA filter 92 is supported on flange 84 of duct 82. A foam gasket 98 (FIG. 2) is positioned between the bottom of the HEPA filter and the top surface of flange 84.

An upper duct 100 (FIGS. 2 and 4) extends from aperture 32. Duct 100 supports louver assembly 34. Duct 100 defines an inlet end 102 above filter assembly 90 and includes sidewalls 103. Duct 100 is secured to wall 40 by fasteners 104.

A filter retaining and sealing structure in accordance with the present invention is included to compress the foam gaskets 96, 98 and sealingly position and mount filter assembly 90 within chamber 42. Such structure includes a filter retainer frame 110 (FIGS. 2 and 4) which rests on top of the filter assembly 90. Frame 110 includes front and back walls or frame members 112, 114, side members 116, 118 and a horizontal flange 119 extending around the inner periphery of members 112, 114, 116 and 118. A pair of intermediate members 120, 122 extend between the front and back members or frame portions 112, 114 and up from flange 119. Intermediate members 120, 122 each include upwardly angled ramps or camming surfaces 126, 128 (FIG. 2). Camming surfaces 128 join to a generally horizontal or flat surface 130. Surface 130 at the center thereof defines an upwardly opening detent notch 132. As seen in FIG. 2, frame 110 is dimensioned to receive the activated charcoal filter 94 with flange 119 engaging an upper peripheral surface of the filter.

A spring or resilient biasing means is provided to clamp the filter assembly between frame 110 and flange 84 and to compress the gaskets or foam seals 96, 98. In the preferred embodiment, the resilient biasing means includes a generally U-shaped, metal rod or bail 140. Bail 140 includes upstanding legs 142 and an elongated base 144. Legs 142 are bent outwardly and pivot within suitable apertures 148 defined by sides 103 of duct 100. Bail 140 may be pivoted from a forward or rearward, inoperative or released position which permits the filter assembly and the frame to be positioned within filter chamber 42. Bail 140 is then pivoted to a retaining position in engagement with the camming surfaces 126 or 128 until the elongated base is received within notches 132. Members 120, 122 bow base 144, as shown in FIG. 4. The bail creates a spring force which biases the frame downwardly in a resilient fashion. Bail 140 clamps the filter assembly between frame 110 and the upper surface of flange 84. Foam gaskets 96, 98 are compressed and an effective seal is created.

Figure 5:
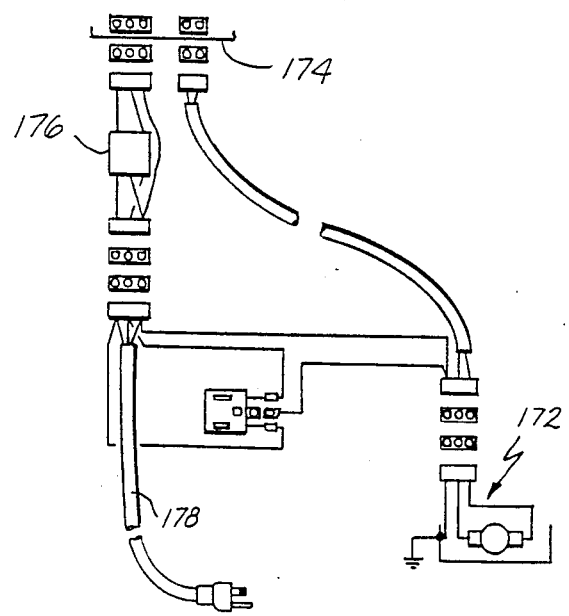
FIG. 5 is a schematic illustration of a control system included in the present invention.

As seen in FIGS. 1, 2 and 5, system 10 includes a control panel 160 and a suitable system to control operation of the blower 70. Panel 160 may mount a digital clock 162 and programming controls 164, 166 and 168. A blower fan speed control 170 is also mounted on front panel 160. As schematically illustrated in FIG. 5, blower speed control 170 is electrically connected to a blower motor 172 through a printed circuit board 174. The electrical control system may also include a radio filter 176. Power is supplied through a cord set 178. Suitable electronics (not shown) may be provided to permit programmed operation of the air treatment system. For example, the system may be programmed to automatically operate for preset periods during the day. In addition, the control system provides for manual operation of the blower motor at different operating speeds. Since such programmed and manual control is well within the skill of the art, a detailed description of the system is not included herein.

The air treatment system in accordance with the present invention provides for effective, highly efficient removal of smoke, pollen, dust, microscopic particles and odor from the air of a relatively closed environment, such as a room. The removable front panel portion 24 provides for easy access to the filter chamber 42. The filter assembly retaining structure including frame 110 and pivotal bail 140 permits the end user to easily install or remove the filter assembly. No special tools are necessary to achieve an effective seal within chamber 42. The structure insures that an effective seal is achieved so that all of the air drawn into the system by blower 70 passes through the HEPA filter and the activated charcoal filter.

In view of the foregoing description, those of ordinary skill may envision various modifications to the preferred embodiment which would not depart from the inventive concepts disclosed. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. An air filtration device, comprising:
  a filter housing including a front panel, a rear panel, side panels and top and bottom panels, said housing defining an air inlet aperture in said rear panel and an air outlet aperture in said front panel;
  a filter disposed within said filter housing, said housing including support means defining a flange for supporting said filter downstream of said air inlet aperture; and
  filter retaining means within said housing for retaining said filter in an operative position, said retaining means comprising:
  a frame engaging said filter at an end opposite said air inlet; and
  a resilient means mounted within said housing for movement between an operative position engaging said frame and resiliently biasing said frame to sealingly clamp said filter between said frame and said flange and a release position releasing said frame and permitting removal of said filter from said housing.

2. An air filtration device as defined by claim 1 wherein said frame includes front and back walls joined to sidewalls and a horizontal flange extending around an inner periphery of said walls, said frame dimensioned so that said walls receive said filter and said flange rests on an upper periphery of said filter.

3. An air filtration device as defined by claim 2 wherein said frame further includes an intermediate member extending between said front and back walls, said intermediate member defining an upwardly opening notch.

4. An air filtration device as defined by claim 3 wherein said resilient means comprises:
  a generally U-shaped rod having an elongated base joined to upstanding legs, said legs at their free ends being pivoted to said housing so that said rod can be rotated from a release position at which said filter may be removed from said housing to a retaining position at which said base is disposed within said notch and said rod resiliently biases said frame into engagement with said filter.

5. An air filtration device as defined by claim 4 wherein said intermediate member is angled upwardly from one of said front and back walls to said notch.

6. An air filtration device as defined by claim 5 wherein said support means comprises a duct defining said flange and an air inlet.

7. An air filtration device as defined by claim 6 further including:
  a screen positioned at said air inlet of said duct; and
  a blower mounted at said air inlet aperture of said housing to force air through said screen, said duct, said filter and said frame to said air outlet aperture.

8. An air filtration device as defined by claim 7 further including a louver assembly disposed within said air outlet aperture.

9. An air filtration device as defined by claim 8 wherein said housing defines a blower chamber having a blower chamber air inlet aperture, said blower being disposed within said blower chamber.

10. An air filtration device as defined by claim 9 further including a foam filter covering said blower chamber air inlet.

11. An air filtration device as defined by claim 10 further including a louver assembly disposed within said air outlet aperture.

12. An air treatment system comprising:
   a housing defining a filter chamber and an inlet chamber;
   a blower disposed within said inlet chamber, said blower including an outlet;
   a duct extending from said blower outlet within said filter chamber, said duct defining a peripheral flange dimensioned to support a generally rectangular filter assembly;
   a generally rectangular filter retaining frame, said frame having side portions joined to end portions and at least one intermediate portion extending between said side portions, said intermediate portion defining a notch; and
   a generally U-shaped bail having an elongated base joined to a pair of spaced legs, said legs being pivoted to said housing within said filter chamber, said bail being dimensioned and positioned so that it may be pivoted into contact with said frame with said elongated base being disposed within said notch to resiliently bias said frame toward said duct and clamp the filter assembly between said frame and said peripheral flange.

13. An air treatment system as defined by claim 12 wherein said housing defines an inlet aperture opening into said inlet chamber, said system further including a filter secured to said housing and covering said inlet aperture.

14. An air treatment system as defined by claim 13 wherein said housing defines a front panel, said panel including an outlet aperture, said system further including a louver assembly mounted in said outlet aperture.

15. An air treatment system as defined by claim 12 further including control means operatively connected to said blower for controlling blower speed and operation.

16. An air treatment system as defined by claim 15 further including a screen positioned between said duct and said blower outlet.

17. An air treatment system as defined by claim 12 wherein said housing further includes a removable front panel to permit access to said filter chamber.

18. An air treatment system as defined by claim 14 further including control means operatively connected to said blower for controlling blower speed and operation.

19. An air treatment system as defined by claim 18 further including a screen positioned between said duct and said blower outlet.

20. An air treatment system as defined by claim 19 wherein said housing further includes a removable front panel to permit access to said filter chamber.

* * * * *